US012547890B2

(12) United States Patent
Erez et al.

(10) Patent No.: US 12,547,890 B2
(45) Date of Patent: Feb. 10, 2026

(54) AUTOREGRESSIVELY GENERATING SEQUENCES OF DATA ELEMENTS DEFINING ACTIONS TO BE PERFORMED BY AN AGENT

(71) Applicant: GDM Holding LLC, Mountain View, CA (US)

(72) Inventors: Tom Erez, London (GB); Alexander Novikov, London (GB); Emilio Parisotto, London (GB); Jack William Rae, London (GB); Konrad Zolna, London (GB); Misha Man Ray Denil, London (GB); Joao Ferdinando Gomes de Freitas, London (GB); Oriol Vinyals, London (GB); Scott Ellison Reed, Atlanta, GA (US); Sergio Gomez, London (GB); Ashley Deloris Edwards, Evans, GA (US); Jacob Bruce, London (GB); Gabriel Barth-Maron, London (GB)

(73) Assignee: GDM Holding LLC, Mountain View, CA (US)

( * ) Notice: Subject to any disclaimer, the term of this patent is extended or adjusted under 35 U.S.C. 154(b) by 1128 days.

(21) Appl. No.: 17/410,689

(22) Filed: Aug. 24, 2021

(65) Prior Publication Data

US 2023/0061411 A1 Mar. 2, 2023

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
CPC .......... G06N 3/08; G06N 3/04; G06N 3/0442; G06N 3/084; G06N 3/0455
See application file for complete search history.

(56) References Cited

U.S. PATENT DOCUMENTS

2018/0165603 A1* 6/2018 Van Seijen ............ G06N 3/045
2019/0332923 A1* 10/2019 Gendron-Bellemare ...................
G06F 17/18
(Continued)

FOREIGN PATENT DOCUMENTS

JP 2019534517 A 11/2019
JP 2020530602 A 10/2020
(Continued)

OTHER PUBLICATIONS

Sugiura K, Iwahashi N, Kashioka H, Nakamura S. Learning, generation and recognition of motions by reference-point-dependent probabilistic models. Advanced Robotics. Jan. 1, 2011;25(6-7):825-48. (Year: 2011).*

(Continued)

*Primary Examiner* — Oluwatosin Alabi
(74) *Attorney, Agent, or Firm* — Fish & Richardson P.C.

(57) ABSTRACT

Methods, systems, and apparatus, including computer programs encoded on a computer storage medium, for selecting actions to be performed by an agent to interact with an environment using an action selection neural network. In one aspect, a method comprises, at each time step in a sequence of time steps: generating a current representation of a state of a task being performed by the agent in the environment as of the current time step as a sequence of data elements; autoregressively generating a sequence of data elements representing a current action to be performed by the agent at the current time step; and after autoregressively generating the sequence of data elements representing the current action, causing the agent to perform the current action at the current time step.

18 Claims, 5 Drawing Sheets

(56) References Cited

U.S. PATENT DOCUMENTS

| | | | |
|---|---|---|---|
| 2019/0346272 | A1 | 11/2019 | Banino |
| 2019/0354567 | A1* | 11/2019 | Dehghani ............ G06N 3/0455 |
| 2019/0354858 | A1* | 11/2019 | Chrzanowski ......... G06N 20/00 |
| 2020/0020337 | A1* | 1/2020 | Lee .......................... G06F 3/013 |
| 2020/0090022 | A1* | 3/2020 | Ma ........................... G06N 3/08 |
| 2020/0092565 | A1 | 3/2020 | Watters |
| 2020/0104685 | A1* | 4/2020 | Hasenclever .......... G06N 3/084 |
| 2020/0160172 | A1* | 5/2020 | Fang ........................ G06N 3/08 |
| 2020/0234145 | A1 | 7/2020 | Dai |
| 2020/0341976 | A1* | 10/2020 | Aggarwal ......... G06F 16/90332 |
| 2022/0066456 | A1 | 3/2022 | Ebrahimi Afrouzi |

FOREIGN PATENT DOCUMENTS

| | | |
|---|---|---|
| WO | WO 2019/060632 | 3/2019 |
| WO | WO 2021/058588 | 4/2021 |

OTHER PUBLICATIONS

Krishnan S, Garg A, Patil S, Lea C, Hager G, Abbeel P, Goldberg K. Transition state clustering: Unsupervised surgical trajectory segmentation for robot learning. The International journal of robotics research. Dec. 2017;36(13-14):1595-618. (Year: 2017).*

Venkatesh SG, Rathod N, Kolathaya S, Amrutur B. Stochastic Action Prediction for Imitation Learning. arXiv preprint arXiv:2101.01055. Dec. 26, 2020. (Year: 2020).*

Aharoni et al., "Massively multilingual neural machine translation," CoRR, Feb. 2019, arxiv.org/abs/1903.00089, 11 pages.

Brown et al., "Language models are few-shot learners," CoRR, May 2020, arxiv.org/abs/2005.14165, 75 pages.

Chen et al., "Decision Transformer: Reinforcement Learning via Sequence Modeling," CoRR, Jun. 2021, arxiv.org/abs/2106.01345, 21 pages.

Janner et al., "Offline Reinforcement Learning as One Big Sequence Modeling Problem," CoRR, Jun. 2021, arxiv.org/abs/2106.02039, 15 pages.

Kaiser et al., "One model to learn them all," CoRR, Jun. 2017, arxiv.org/abs/1706.05137, 10 pages.

Keskar et al., "CTRL: A conditional transformer language model for controllable generation," CoRR, Sep. 2019, arxiv.org/abs/1909.05858, 18 pages.

Pratap et al., "Massively multilingual ASR: 50 languages, 1 model, 1 billion parameters," CoRR, Jul. 2020, arxiv.org/abs/2007.03001, 5 pages.

Reed et al., "Neural programmer-interpreters," CoRR, Nov. 2015, arxiv.org/abs/1511.06279, 13 pages.

Schmidhuber, "One big net for everything," CoRR, Feb. 2018, arxiv:1802.08864, 17 pages.

Srivastava et al., "Training agents using upside down reinforcement learning," CoRR, Dec. 2019, arxiv.org/abs/1912.02877, 31 pages.

Vaswani et al., "Attention is all you need," Advances in Neural Information Processing Systems, Dec. 2017, 11 pages.

Ben-David et al., "PADA: a prompt-based autoregressive approach for adaptation to unseen domains," CoRR, Feb. 24, 2021, https://arxiv.org/abs/2102.12206, 15 pages.

International Search Report and Written Opinion in International Appln. No. PCT/EP2022/072731, dated Nov. 24, 2022, 19 pages.

Korenkevych et al., "Autoregressive policies for continuous control deep reinforcement learning," CoRR, Mar. 27, 2019, https://arxiv.org/abs/1903.11524, 13 pages.

Zhu et al., "Reinforcement and imitation learning for diverse visumotor skills," Robotics: Science and Systems XIV, Feb. 2018, 12 pages.

Decision to Grant Patent in Japanese Appln. No. 2024-512162, mailed on Jul. 8, 2025, 5 pages (with English translation).

Metz et al., "Discrete sequential prediction of continuous actions for deep RL," CoRR, submitted May 14, 2017, arXiv:1705.05035, 26 pages.

\* cited by examiner

AUTOREGRESSIVELY GENERATING SEQUENCES OF DATA ELEMENTS DEFINING ACTIONS TO BE PERFORMED BY AN AGENT

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes an action selection system implemented as computer programs on one or more computers in one or more locations for controlling an agent interacting with an environment to perform a task.

Throughout this specification, a "data element" can refer to, e.g., a numerical value (e.g., an integer or floating point numerical value) or an embedding. An embedding refers to an ordered collection of numerical values, e.g., a vector, matrix, or other tensor of numerical values.

According to a first aspect there is provided a method performed by one or more computers for selecting actions to be performed by an agent to interact with an environment using an action selection neural network, the method comprising, at each time step in a sequence of time steps: generating a current representation of a state of a task being performed by the agent in the environment as of the current time step as a sequence of data elements; autoregressively generating a sequence of data elements representing a current action to be performed by the agent at the current time step, comprising, for each position starting from a first position in the sequence of data elements representing the current action: processing the current representation of the state of the task using the action selection neural network to generate a score distribution over a set of possible data elements; selecting a data element for the position in the sequence of data elements representing the current action in accordance with the score distribution; and updating the current representation of the state of the task by concatenating the selected data element for the position to the current representation of the state of the task; and after autoregressively generating the sequence of data elements representing the current action, causing the agent to perform the current action at the current time step.

In some implementations, for each time step in the sequence of time steps, generating the current representation of the state of the task as of the current time step comprises: receiving a current observation characterizing a state of the environment at the current time step; generating a representation of the current observation as a sequence of data elements; and including the representation of the current observation as a sequence of data elements in the current representation of the state of the task as of the current time step.

In some implementations, the current observation is defined by a collection of numerical values, and generating the representation of the current observation as a sequence of data elements comprises: concatenating each numerical value in the collection of numerical values defining the current observation into a sequence of numerical values in a predefined order.

In some implementations, generating the representation of the current observation as a sequence of data elements further comprises: discretizing each numerical value in the collection of numerical values defining the current observation.

In some implementations, the current observation characterizing the current state of the environment at the current time step comprises an image defined by an array of pixels.

In some implementations, generating the representation of the current observation as a sequence of data elements comprises: combining a target return to be achieved by interaction of the agent with the environment with the representation of the current observation as a sequence of data elements, wherein the target return defines a cumulative measure of rewards to be achieved as a result of the interaction of the agent with the environment.

In some implementations, for each time step after a first time step in the sequence of time steps, including the representation of the current observation as a sequence of data elements in the current representation of the state of the task as of the current time step comprises: receiving a representation of the state of the task as of a previous time step as a sequence of date elements; and concatenating the representation of the current observation as a sequence of data elements to the representation of the state of the task as of the previous time step as a sequence of data elements to generate the current representation of the state of the task as of the current time step.

In some implementations, the representation of the state of the task as of the previous time step represents, for each time step preceding the current time step: (i) a respective observation characterizing a state of the environment at the time step, and (ii) a respective action performed by the agent at the time step.

In some implementations, at a first time step in the sequence of time steps, including the representation of the current observation as a sequence of data elements in the current representation of the state of the task as of the current time step comprises: receiving a prompt that comprises data characterizing the task to be performed by the agent in the environment; generating a representation of the prompt as a sequence of data elements; and concatenating the representation of the current observation as a sequence of data elements to the representation of the prompt as a sequence of data elements to generate the current representation of the state of the task as of the current time step.

In some implementations, the prompt comprises one or more of: a demonstration of the task, a goal observation characterizing a goal state of the environment, or a sequence of text in a natural language that provides instructions related to the task.

In some implementations, the action selection neural network has been trained on a set of training examples, wherein for each training example: the training example is represented as a sequence of data elements; at least one of the data elements in the sequence of data elements representing the training example is designated as an action data element; and training the action selection neural network on the training example comprises training the action selection neural network to generate the action data elements included in the training example.

In some implementations, the set of training examples includes respective training examples from multiple different control domains, wherein each control domain is associated with: (i) a corresponding agent, (ii) a corresponding environment, and (iii) a corresponding task, wherein each training example from each control domain characterizes interaction of the corresponding agent with the corresponding environment by performing actions to accomplish the corresponding task.

In some implementations, the multiple different control domains include a first control domain where observations of the corresponding environment have a first dimensionality, and a second control domain where observations of the corresponding environment have a second, different dimensionality.

In some implementations, the multiple different control domains include a first control domain where actions performed by the corresponding agent have a first dimensionality, and a second control domain where actions performed by the corresponding agent have a second, different dimensionality.

In some implementations, the set of training examples includes a plurality of language modeling training examples, wherein each language modeling training example represents a sequence of text in a natural language.

In some implementations, the action selection neural network comprises a plurality of self-attention neural network layers.

In some implementations, for each position starting from the first position in the sequences of data elements representing the current action, selecting the data element for the position comprises: selecting a data element having a highest score under the score distribution.

In some implementations, for each time step in the sequence of time steps, the sequence of data elements representing the state of the task as of the current time step comprises: a sequence of numerical values; a sequence of embeddings; or a sequence that includes numerical values at some positions and embeddings at other positions.

According to another aspect there is provided a system comprising: one or more computers; and one or more storage devices communicatively coupled to the one or more computers, wherein the one or more storage devices store instructions that, when executed by the one or more computers, cause the one or more computers to perform operations of the methods described herein.

One or more non-transitory computer storage media storing instructions that when executed by one or more computers cause the one or more computers to perform operations of the methods described herein.

Particular embodiments of the subject matter described in this specification can be implemented so as to realize one or more of the following advantages.

The action selection system described in this specification selects actions to be performed by an agent in an environment using an autoregressive action selection neural network that operates on sequences of data elements. In particular, the action selection system represents both observations and actions as sequences of data elements, and operates on these sequences using the action selection neural network to autoregressively generate sequences of data elements representing actions to be performed by an agent in an environment. Because the action selection neural network operates on sequences of data elements, it can be trained on any training example that can be represented as a sequence of data elements. Thus the action selection neural network can be trained on training examples representing interaction of any agent with any environment to perform any task, irrespective of the respective dimensionalities of the observations of the environment and of the actions performed by the agent.

The action selection system trains the action selection neural network on a highly diverse set of training examples, representing interaction of multiple different agents with multiple different environments to perform multiple different tasks. The action selection neural network thus learns a flexible and transferable understanding of agent control that enables it to generalize rapidly and effectively to new domains. In particular, the action selection neural network can perform "few-shot learning," i.e., the action selection neural network can be trained to achieve an acceptable level of performance on a task in a new domain after being trained on only a small number of training examples from the new domain. In some cases, the action selection neural network can perform "zero-shot learning," i.e., by achieving an acceptable level of performance on a task in a new domain without being trained on any training examples from the new domain. The action selection system therefore provides a general purpose model for agent control that is more broadly applicable than conventional action selection systems. The action selection system enables more efficient use of computational resources (e.g., memory and computing power) by requiring less training data and fewer training iterations than conventional systems to achieve an acceptable level of performance on controlling agents in new domains.

In addition to training the action selection neural network to perform agent control tasks, the action selection system can also train the action selection neural network to perform language modeling, i.e., by training the action selection neural network on sequences of data elements representing text in a natural language. Training the action selection neural network to perform language modeling can accelerate the training and improve the performance of the action selection neural network, e.g., by improving the capability of the action selection neural network to implicitly infer the meaning of natural language prompts provided to the action selection neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
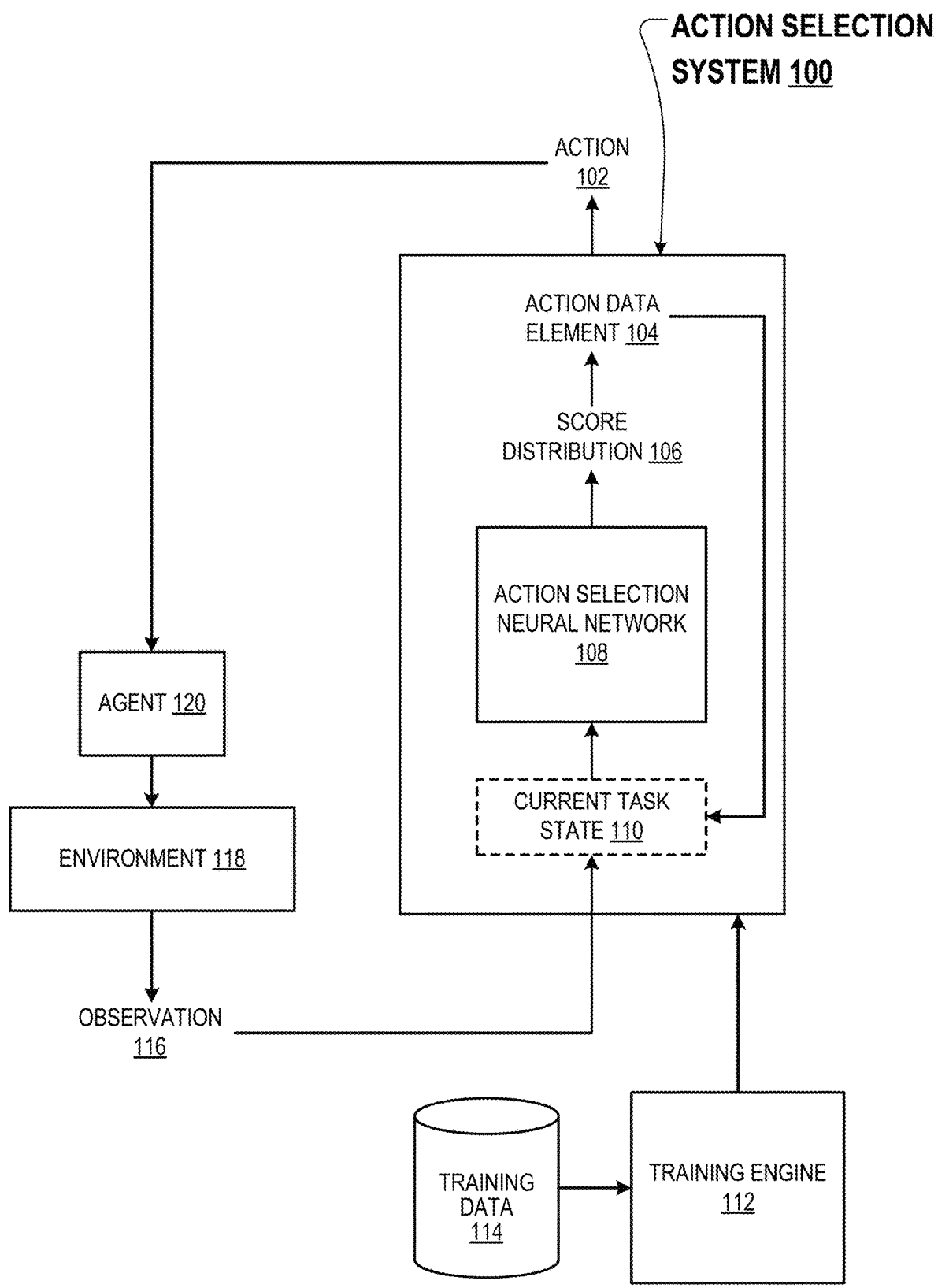
FIG. 1 shows an example action selection system.

FIG. 1 shows an example action selection system 100. The action selection system 100 is an example of a system implemented as computer programs on one or more computers in one or more locations in which the systems, components, and techniques described below are implemented.

The system 100 selects actions 102 to be performed by an agent 120 interacting with an environment 118 at each of multiple time steps to accomplish a task in the environment 118.

At each time step, the system 100 receives an observation 116 characterizing the current state of the environment 118, and selects an action to be performed by the agent 120 in response to the observation 116.

Each time step can be associated with a reward, e.g., based on the state of the environment 118 at the time step, the action 102 performed by the agent 120 at the time step, or both. Generally, the reward can be represented as a numerical value. The reward can be based on any event in or aspect of the environment 118. For example, the reward can indicate whether the agent 120 has accomplished a task in the environment (e.g., navigating to a target location in the environment 118), or the progress of the agent towards accomplish a task. In some implementations, the reward can be a sparse reward that has value 0 at each time step before the agent accomplishes a task, and value 1 (or some other positive value) at the time step that the agent accomplishes the task. In some implementations, the reward can be a dense reward that has non-zero values at time steps before the agent accomplishes a task, e.g., if the task involves navigating to a target location, then the reward at each time step can vary continuously based on the proximity of the agent to the target location.

A training engine 112 can train the system 100 to select actions that increase a "return" generated by interaction of the agent 120 with the environment 118 by performing actions 102 selected by the system 100, as will be described in more detail below. A return refers to a cumulative measure of rewards, e.g., a time discounted sum of rewards, generated by interaction of the agent 120 with the environment 118.

In some implementations, the environment is a real-world environment and the agent is a mechanical agent interacting with the real-world environment. For example, the agent may be a robot interacting with the environment to perform a task, e.g., to locate an object of interest in the environment, to move an object of interest to a specified location in the environment, to physically manipulate an object of interest in the environment in a specified way, or to navigate to a specified destination in the environment; or the agent may be an autonomous or semi-autonomous land, air, or sea vehicle navigating through the environment to a specified destination in the environment.

In these implementations, the observations may include, for example, one or more of images (where an image can be represented, e.g., as an array of pixels), object position data, and sensor data to capture observations as the agent interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, data obtained by one of more sensor devices which sense a real-world environment; for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

The actions may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

For example, the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game.

In a further example the simulated environment may be a protein folding environment such that each state is a respective state of a protein chain and the agent is a computer system for determining how to fold the protein chain. In this example, the actions are possible folding actions for folding the protein chain and the task to be performed may include, e.g., folding the protein so that the protein is stable and so that it achieves a particular biological function.

Generally in the case of a simulated environment the observations may include simulated versions of one or more of the previously described observations or types of observations and the actions may include simulated versions of one or more of the previously described actions or types of actions.

In some cases, the action selection system 100 can be used to control the interactions of the agent with a simulated environment, and the training engine 112 can train the parameters of the action selection system based on the interactions of the agent with the simulated environment. After the action selection system is trained based on the interactions of the agent with a simulated environment, the agent can be deployed in a real-world environment, and the trained action selection system can be used to control the interactions of the agent with the real-world environment. Training the action selection system based on interactions of the agent with a simulated environment (i.e., instead of a real-world environment) can avoid wear-and-tear on the agent and can reduce the likelihood that, by performing poorly chosen actions, the agent can damage itself or aspects of its environment.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to perform the task of increasing efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment is a real-world environment and the agent manages distribution of tasks across computing resources e.g. on a mobile device and/or in a data center. In these implementations, the actions may include assigning tasks to particular computing resources, and the task to be performed can include minimizing the time required to complete a set of tasks using specified computing resources.

As a further example, the actions may include presenting advertisements, the observations may include advertisement impressions or a click-through count or rate, and the reward may characterize previous selections of items or content taken by one or more users. In this example, the task to be performed can include maximizing selections of item or content by the one or more users.

As a further example, the agent can generate actions that represent sequences of text in a natural language. In some implementations, the task be can be, e.g., to generate sequences of natural language text that are responsive to observations represented by sequences of natural language text. In some implementations, the task can be, e.g., to generate sequences of natural language text that represent instructions to control a (real or simulated) physical agent (e.g., "turn left," "speed up," "activate lights," etc.) to perform a task in a (real or simulated) physical environment.

As a further example, the agent can generate actions that represent sequences of computer code (e.g., in a computer programming language). In some implementations, the task can involve receiving an observation that defines a natural language description of desired computer code, and in response, generating a sequence of computer code that fits the natural language description of the desired computer code. In some implementations, the task can involve receiving an observation that defines a input sequence of computer code, and in response, generating an output sequence of computer code that is a completion of the input sequence of computer code (e.g., that logically extends the input sequence of computer code).

To select actions 102 to be performed by the agent 120, the system 100 maintains and iteratively updates a current task state 110 that is represented as a sequence of data elements. The sequence of data elements representing the current task state 110 can be, e.g., a sequence of numerical values, a sequence of embeddings, or a sequence that includes numerical values in some positions and embeddings in other positions. At each time step, the current task state 110 represents the state of the task being performed by the agent in the environment as of the time step.

Optionally, prior to the first time step (i.e., the first time step in a sequence of multiple time steps during which the agent interacts with the environment to perform a task), the system 100 can initialize the current task state 110 by a "prompt," which can be any appropriate data that characterizes the task to be performed by the agent 120 in the environment 118. The prompt can be provided to the system 100, e.g., by a user of the system 100. A few examples of prompts are described in more detail next, and example techniques for representing prompts as sequences of data elements are described in more detail below.

In some implementations, the prompt can include a demonstration of the task to be performed by the agent in the environment. That is, the prompt can characterize interaction of the agent with the environment over a sequence of time steps during which the agent makes progress towards accomplishing the task in the environment. The prompt can be defined by a sequence of "interaction tuples," where each interaction tuple corresponds to a respective time step and represents: an observation of the environment at the time step, an action performed by the agent at the time step, or both.

The prompt can include a demonstration of a task that is different from (but related to) the task to be performed by the agent 120 in the environment 118. For example, if the agent 120 is a robotic agent and the task to be performed by the agent 120 involves grasping and moving one type of object (e.g., an object having a cubic shape), then the prompt can define a demonstration of grasping and moving a different type of object (e.g., an object having a spherical shape).

The prompt can include a demonstration of a task in an environment that is different from the environment 118 in which the agent 120 will perform its task. For example, if the agent 120 is a household robotic agent and the task to be performed by the agent involves cleaning a room (e.g., a kitchen), then the prompt can define a demonstration of an agent cleaning a different room (e.g., a bathroom).

The prompt can include a demonstration of a task being performed by an agent that is different from the agent 120 being controlled by the system 100. For example, if the agent is a robotic agent 120 with a robotic arm, then the prompt can define a demonstration by an agent with a differently configured robotic arm (e.g., having a different length) performing a task.

In some implementations, the prompt can include a "goal" observation, e.g., that characterizes a goal state of the environment such that the agent 120 accomplishes the task by performing actions that cause the environment to transition into the goal state (or a state related to the goal state). For example, if the agent 120 is a robotic agent and the task to be performed by the agent 120 involves assembling a set of components (e.g., electronic or mechanical components), then the goal observation can be, e.g., an image showing the set of components assembled into the desired configuration.

In some implementations, the prompt can include a sequence of text in a natural language (e.g., English) that provides instructions related to the task to be performed by the agent 120 in the environment 118. For example, if the agent 120 is a semi- or fully-autonomous vehicle, then the prompt can be the sequence of words "park the car in the parking spot closest to the entrance of the store" or "merge onto the highway and move into the leftmost lane."

In some implementations, the prompt can include data characterizing the task to be performed by the agent 120 in multiple different ways, e.g., the prompt can include both a demonstration of the task and a sequence of text in a natural language that provides instructions related to the task.

The system 100 can represent the prompt as a sequence of data elements in any appropriate way. For example, if the prompt includes a sequence of text, then the system 100 can represent the sequence of text as a sequence of tokens from a predefined set of tokens, and then map each token to a corresponding numerical value in accordance with a predefined mapping. The set of tokens can include, e.g., characters, n-grams, word pieces, words, or a combination thereof. Example techniques for representing observations and actions as a sequence of data elements, which can be applied to represent a demonstration of a task or a goal observation in a prompt as a sequence of data elements, are described in more detail below.

Generally, the prompt encodes information that can enable the system 100 to infer the task to be performed by the agent 120 in the environment 118, and thus select actions to be performed by the agent 120 to accomplish the task.

In some cases, as described above, the prompt represents a task demonstration in a different environment (e.g., that differs from the environment 118), or a task demonstration by a different agent (e.g., that is differently configured from the agent 120), or a task demonstration of a task that is different but related to the task to be performed by the agent 120. In these cases, the system 100 can incorporate information encoded in the prompt with information encoded in observations 116 of the environment 118 to infer the task to be performed by the agent 120 in the environment 118. For example, if the agent is a household robot and the task to be performed by the agent involves cleaning a target house, then the prompt can include a demonstration of the agent cleaning a different house. In this example, the system can combine the information representing the cleaning task, as encoded in the prompt, with the information representing the target house, as encoded in observations received by the system, to implicitly infer that the task to be performed by agent involves cleaning the target house.

In some cases the system 100 can implicitly infer the task to be performed by the agent 120 even in the absence of a prompt, in particular, based on information encoded in observations received by the system 100. For example, the system 100 can implicitly infer from observations that the agent 120 is interacting with a type of environment where the agent generally performed a particular task during training, and on this basis, select actions to be performed by the agent to accomplish the particular task.

At each time step, the system 100 receives a current observation 116 characterizing the state of the environment 118 at the time step, and uses the current observation 116 to update the current task state 110. For example, the system 100 can represent the current observation 116 as a sequence of data elements, and update the current task state 110 by concatenating the sequence of data elements representing the current observation to the sequence of data elements representing the current task state 110. That is, in this example, the updated task state is represented by the sequence of data elements defined by concatenating: (i) the sequence of data elements representing the current task state 110, and (ii) the sequence of data elements representing the current observation 116.

The system 100 can represent the current observation 116 for the time step as a sequence of data elements in any appropriate way. The sequence of data elements representing the current observation 116 can be, e.g., a sequence of numerical values, a sequence of embeddings, or a sequence that includes numerical values in some positions and embeddings in other positions. A few example techniques for representing the current observation 116 as a sequence of data elements are described next.

Generally, when received by the system 100, the current observation 116 is defined by an ordered collection of numerical values, e.g., a vector, matrix, or other tensor of numerical values. (The number of numerical values in the ordered collection of numerical values defining the observation can be referred to as the "dimensionality" of the observation). In some implementations, the system 100 can represent the collection of numerical values defining the current observation 116 as a sequence of numerical values, e.g., by concatenating the numerical values defining the current observation into a sequence of numerical values in an arbitrary but fixed order.

For example, if the observation 116 includes an image represented by an array of pixel intensity values, then the system 100 can represent the array of pixel intensity values as a sequence of numerical values by concatenating each pixel intensity value in the array of pixel intensity values representing the image into a sequence of pixel intensity values in an arbitrary but fixed order. If the array of pixel intensity values is an N×N array having N rows and N columns, then the system can, e.g., concentrate the pixel intensity values in each row of the array, starting from the first position in the row until the last position in the row, for the first row in the array until the last row in the array.

As another example, if the observation includes a position value (e.g., representing a position of the agent in the environment), a velocity value (e.g., representing a velocity of the agent in the environment), and an acceleration value (e.g., representing an acceleration of the agent in the environment), then the system can concatenate these numerical values in any predefined order, e.g., position value, followed by velocity value, followed by acceleration value.

In some implementations, to generate a representation of an observation 116 (or some portion of an observation 116) as a sequence of numerical values, the system 100 first generates an embedding (e.g., a lower-dimensional embedding) of the observation 116 by processing the observation 116 using an encoder machine learning model. The system 100 can then concatenate the numerical values defining the embedding of the observation into a sequence of numerical values representing the observation in an arbitrary but fixed order. The encoder machine learning model can be, e.g., an encoder neural network of an auto-encoder machine learning model. In one example, the observation 116 can include an image, and the system 100 divides the image into patches (i.e., spatial regions) and generates a respective embedding of each patch using an encoder machine learning model. The system can then concatenate the respective numerical values defining the embedding of each patch to generate a representation of the image as a sequence of numerical values.

In some implementations, the system 100 can generate a representation of an observation as a sequence of one or more embeddings. For example, the system 100 can generate a representation of an image as sequence of embeddings by dividing the image into a sequence of patches, and then generating a respective embedding of each patch using an encoder machine learning model.

Optionally, the system 100 can perform "return conditioning" by generating an additional numerical value ("return value") representing a target return to be achieved by interaction of the agent 120 with the environment 118, and combining the return value with the sequence of data elements representing the current observation. For example, the system 100 can perform return conditioning by concatenating the return value to the sequence of data elements representing the current observation 116.

Generally, the system 100 aims to select actions 102 that maximize the return received by the agent 120. The system 100 can thus set the return value to a predefined "expert" return value representing the return that would be achieved by expert performance of the task by the agent. The system can compute the expert return value, e.g., as the average return value achieved when the agent performed the task one or more times under the control of an expert, e.g., a human expert. Performing return conditioning enables the training engine 112 to effectively train the system 100 on training examples where the agent receives a range of possible returns (including, optionally, low returns), as will be described in more detail below. The training engine 112 can normalize the return values used during training such that the optimal return value for each task is the same predefined value, e.g., the value 1, by dividing return values by the expert return value, as will be described in more detail below.

Optionally, if the system 100 initializes the current task state 110 using a prompt that includes a task demonstration, then the prompt can include return conditioning as well. For example, each observation in the prompt can include an additional value representing the return that was achieved during the task demonstration.

As part of representing the current observation 116 as a sequence of data elements, the system 100 can discretize each numerical value in the collection of numerical values defining the current observation 116. Discretizing a numerical value can refer to mapping the numerical value to a corresponding numerical value from a finite, predefined set of "discretized" numerical values, e.g., integer values in the range [0, 255]. To discretize a numerical value, the system 100 can first apply a transform function (e.g., a μ-law transform function) to the numerical value to map it into a predefined range (e.g., the range [—1,1]). The predefined range can be associated with a predefined partition into a set of intervals, and each of these intervals can be associated with a corresponding discretized numerical value from a predefined set of discretized numerical values. Applying the transform function to the numerical value will cause the numerical value to be included in one of the intervals, and the system 100 can discretize the numerical value by mapping it to the discretized numerical value associated with the interval.

After updating the current task state 110 using the current observation 116, the system 100 processes the current task state 110 to autoregressively generate a sequence of one or more data elements that collectively represent the action 102 to be performed by the agent at the current time step. Each data element in the sequence of data element representing the action 102 will be referred to herein as an "action data element" 104, i.e., such that the action 102 is defined by the sequence of action data elements 104 generated by the action selection neural network 108.

The system 100 generates the respective action data element 104 at each position in the sequence of action data elements defining the current action 102 in order, starting from the first position in the sequence. The system 100 generates each action data element 104 by processing the current task state 110 using the action selection neural network 108, in accordance with the parameter values of the action selection neural network 108, to generate a score distribution 106 over a set of possible action data elements. The set of possible action data elements can be any appropriate set of data elements, e.g., integer values in the range [0,255], or a predefined set of set embeddings. The system 100 then selects the action data element 104 using the score distribution 106 over the set of possible action data elements. For example, the system 100 can select the action data element 104 having the highest score according to the score distribution 106. As another example, the system 100 can sample an action data element from the set of possible action data elements in accordance with a probability distribution over the set of possible action data elements, e.g., that can generated by processing the score distribution 106 using a soft-max function.

In some cases, for one or more positions in the sequence of action data elements defining the current action 102, the set of valid action data elements at the position can be proper subset of the set of possible action data elements. An action data element at a position can be referred to as being "valid" if an action that includes the action data element at the position represents a feasible action that be can be performed by the agent. For example, if the action data element at a position represents a torque to be applied to a joint of a robotic agent, the robotic agent can apply M possible torques to the joint, and the set of possible action data elements include N>M action data elements, then M of the possible action data elements can be designated as being valid action data elements at the position. The system can ensure that the action data element selected at each position is a valid action data element, e.g., by selecting the valid action data element having the highest score according the score distribution over the set of possible action elements at the position.

After generating each action data element 104, the system 100 updates the current task state 110 by concatenating the action data element 104 to the current task state 110 before generating the next action data element 104 in the sequence of action data elements 104 defining the current action 102. Thus the action selection neural network 108 generates the sequence of action data elements 104 autoregressively, i.e., because the action data element 104 at each position is generated by processing a current task state 110 which includes the action data elements 104 generated for each preceding position. An example of selecting actions to be performed by the agent by autoregressively generating action data elements using the action selection neural network 108 is illustrated with reference to FIG. 3A and FIG. 3B.

The sequence of action data elements 104 defines the action 102 to be performed by the agent 120 at the time step. For example, if the agent is a mechanical agent, then the action data element 104 at each position in the sequence can define a torque to be applied to the corresponding joint of the robot. As another example, if the agent is an autonomous vehicle, then the action data element 104 at one position can define an acceleration/deceleration to be implemented by the vehicle, and the action data element 104 at another positon can define steering to be implemented by the vehicle.

Optionally, a hyper-parameter of the system 100 can specify a maximum length of the current task state 110, i.e., a maximum number of data elements that can be included in the current task state 110. As the system 100 concatenates data elements representing new observations and actions onto the "terminal" end of the current task state, the length of the current task state increases. The system can therefore remove data elements from the "initial" end of the current task state as necessary to ensure that the length of the current task state remains at most the maximum length. (The terminal end of the current task state refers to the position occupied by the final data element in the sequence of data elements representing the current task state, and the initial end of the current task state refers to the position occupied by the first data element in the sequence of data elements representing the current task state).

The action selection neural network 108 can have any appropriate neural network architecture that enables it to perform its described function, i.e., processing a current task state 110 to generate a score distribution over a set of possible action data elements. In particular, the action selection neural network can include any appropriate neural network layers (e.g., attention layers, convolutional layers, fully-connected layers, etc.) in any appropriate number (e.g., 5 layers, 10 layers, or 100 layers) and connected in any appropriate configuration (e.g., as a linear sequence of layers).

A few examples of possible architectures of the action selection neural network 108 are described next. In each of these examples, the action selection neural network can include an embedding layer that is configured to map each data element in the sequence of data elements defining the current task state 110 that is represented as a numerical value to a corresponding embedding in an embedding space. The embedding layer can maintain the data elements in the sequence of data elements defining the current task state 110 that are already represented as embeddings without modification. That is, the embedding layer can represent the current task state 110 as a collection of embeddings by replacing each numerical value included in the current task state 110 by a corresponding embedding, e.g., in accordance with a predefined mapping from numerical values to embeddings.

Optionally, for each position in the current task state 110, the embedding layer can combine (e.g., sum or average) the embedding for the position with a positional embedding representing the position in the current task state. Such positional embeddings can enable the action selection neural network to make full use of the order of the data elements in the current task state 110 without relying on recurrence or convolutions.

In one example, the action selection neural network 108 can process the current task state 110 using an embedding layer to generate a collection of embeddings representing the current task state 110. The action selection neural network 108 can then process the embeddings representing the current task state 110 using a sequence of neural network layers, including one or more self-attention layers (e.g., query-key-value self-attention layers), to generate a set of updated embeddings. The action selection neural network 108 can process the updated embeddings using one or more final neural network layers to project the updated embeddings to a score distribution over the set of possible action data elements. In a particular example, the action selection neural network 108 can have the architecture of a decoder of a Transformer neural network, e.g., as described with reference to: A. Vaswani et al., "Attention is all you need," arXiv:1706.03762v5, Dec. 6, 2017.

In another example, the action selection neural network 108 can include an embedding layer, followed by a fully-connected layer that is applied separately to a respective embedding representing each data element in the sequence of data elements representing the current task state. The updated embeddings generated by the fully-connected layer can be combined (e.g., averaged), and then processed by a final fully-connected neural network layer to generate a score distribution over the set of possible action data elements.

In another example, the action selection neural network 108 can be a recurrent neural network (RNN), e.g., a long short-term memory (LSTM) neural network. The RNN can be configured to process an embedding representing a data element to update a hidden state (e.g., cell state) of the RNN, and to optionally process the updated hidden state to generate a score distribution over the set of possible action data elements. After receiving an observation, the RNN can process a respective embedding corresponding to each data element in a sequence of data elements representing the observation, one at a time and in order starting from the first position in the sequence, to repeatedly update the hidden state of the RNN. The RNN can then autoregressively generate a sequence of data elements defining the action to be performed in response to the observation. In particular, for each position in the sequence of action data elements, the RNN processes its current hidden state to generate a score distribution over the set of possible action data elements that is used to select the action data element for the position. The RNN then processes an embedding representing the action data element selected for the position to update its hidden state before generating the score distribution over the set of possible action data elements for the next position.

A training engine 112 can train the action selection neural network 108 on training data 114 that includes a set of training examples. Each training example is represented as a sequence of data elements, e.g., a sequence of numerical values, a sequence of embeddings, or a sequence that includes numerical values at some positions and embeddings at other positions.

To train the action selection neural network 108 on a training example represented as a sequence of data elements, the training engine 112 can generate a respective prediction for each of one or more data elements included in the training example. To generate a prediction for a specified data element in a training example, the training engine 112 can process the subsequence of data elements that precede the specified data element in the training example (i.e., which collectively represent a "current task state") to generate a score distribution over a set of possible data elements. The training engine 112 can determine gradients of a loss function that measures an error, e.g., a cross-entropy error, between: (i) the score distribution over the set of possible data elements, (ii) the specified data element in the training example. The training engine 112 can determine gradients of the loss function with respect to the parameter values of the action selection neural network, e.g., using backpropagation. The training engine 112 can use the gradients of the loss function to adjust the current values of the action selection neural network parameters using any appropriate gradient descent optimization algorithm, e.g., Adam or RMSprop.

Each data element included in a training example can be designated as being: an action data element, an observation data element, or a prompt data element. An action data element refers to a data element in a sequence of one or more data elements that represents an action (as described above). An observation data element refers to a data element in a sequence of one or more data elements that represents an observation. (Optionally, if the training engine 112 performs return conditioning, then one of the observation data elements in a sequence of observation data elements for an observation can represent a return, as will be described in more detail below). A prompt data element refers to a data element in a sequence of one or more data elements that represents a prompt.

In some implementations, the training engine 112 trains the action selection neural network to predict only the actions included in each training example. That is, the training engine 112 trains the action selection neural network to generate only the data elements in each training example that are designated as being action data elements.

In other implementations, the training engine 112 trains the action selection neural network to predict both the actions and the observations included in each training example. That is, the training engine 112 trains the action selection neural network to generate the data elements in each training example that are designated as being either action data elements or observation data elements.

Generally, the action selection neural network can generate a score distribution over a set of possible observation data elements in the same manner as the action selection neural network generates a score distribution over a set of possible action data elements. In some cases (e.g., if the set of possible observation data elements is different than the set of possible action data elements), the action selection neural network includes one output head (i.e., subnetwork) that is configured to generate score distributions over the set of possible observation data elements, and a separate output head that is configured to generate score distributions over the set of possible action data elements.

Training the action selection neural network to predict both observations and actions included in training examples causes the action selection neural network to implicitly learn models of environment dynamics, which can enable the action selection neural network to select actions for performing tasks more effectively.

When the action selection neural network is used to select actions to be performed to control an agent, the action selection neural network generates action data elements autoregressively. However, it can be appreciated that, during training, the training engine can use the action selection neural network to generate predictions for each data element included in each training example in parallel, which can significantly increase the efficiency of training.

Optionally, the training engine can autoregressively generate predictions for actions, observations, or both during training. For example, to generate predictions for the action data elements defining an action in a training example, the training engine can initialize a current task state that includes the subsequence of data elements prior to the first action data element in the sequence of action data elements defining the action in the training example. The training engine can then process the current task state to autoregressively generate predictions for the action data elements defining the action, as described above.

Generally, any sequence of data elements, from any appropriate source, can be used as a training example for training the action selection neural network 108. Therefore the training engine 112 can train the action selection neural network 108 on training examples from a large variety of sources. A few example techniques for generating training examples for training the action selection neural network are described in more detail next.

In one example, the training engine 112 can generate a training example that represents interaction of an agent with an environment over a sequence of time steps. The interaction of the agent with the environment can be represented in the form: $(s_i, a_i, r_i)_{i=1}^{N}$, where N is the number of time steps, $s_i$ is the state of the environment at time step i, $a_i$ is the action performed by the agent at time step i, and $r_i$ is the reward received at time step i. Generally, each state $s_i$ and each action $a_i$ can be represented as an ordered collection of numerical values, e.g., a vector, matrix, or other tensor of numerical values. (The number of numerical values in an ordered collection of numerical values defining an action can be referred to as the "dimensionality" of the action).

To generate a training example representing the interaction of the agent with the environment, the training engine 112 represents each observation as a sequence of data elements, e.g., a sequence of numerical values or a sequence of embeddings. For example, the training engine 112 can represent the respective collection of numerical values defining each observation as a sequence of numerical values, e.g., by concatenating the numerical values defining the observation into a sequence of numerical values in an arbitrary but fixed order. (Example techniques for representing an observation as a sequence of embeddings are described above). The training engine 112 can perform return conditioning by determining the return, e.g., by computing a time-discounted sum of the rewards, and then concatenating the return to the sequence of data elements representing each observation. Optionally, the training engine 112 can normalize the return, e.g., by dividing the return by the expert return for the task being performed by the agent, e.g., the average return value achieved when the agent performed the task one or more times under the control of an expert, e.g., a human expert. The training engine 112 also represents each action as a sequence of data elements, e.g., the training engine 112 can represent an action as a sequence of numerical values by concatenating a collection of numerical value representing the action into a sequence of numerical values. The training engine 112 then concatenates the respective sequences of data elements representing the respective observation and the respective action at each time step into one sequence of data elements. As part of generating the training example, the training engine 112 can optionally discretize the numerical values in the collections of numerical values representing the observations, the actions, or both.

Optionally, the training engine 112 can generate a representation of a prompt for the training example as a sequence of data elements, and concatenate the prompt to the sequence of data elements representing the training example.

Performing return conditioning enables the training engine 112 to effectively train the action selection neural network 108 on training examples where the agent receives a range of possible returns, including low returns. The return associated with a training example being low can indicate that the training example represents agent interaction with an environment during which the agent failed to perform its task. In the absence of return conditioning, training the action selection neural network 108 on a training example associated with a low return could diminish the performance of the action selection neural network 108, e.g., by reinforcing an ineffective action selection policy represented by the training example. Performing return conditioning enables the action selection neural network to distinguish between training examples representing effective and ineffective action selection policies and can thereby enhance the performance of the action selection neural network 108.

In another example, the training engine 112 can generate a "language modeling" training example that represents a sequence of text in a natural language. The training engine 112 can represent the sequence of text as a sequence of tokens from a predefined set of possible tokens (e.g., characters, n-grams, or words), and then replace each token by a corresponding data element, e.g., an integer numerical identifier indexing the token in the set of possible tokens, or an embedding. The training example can then be represented by the sequence of data elements identifying the sequence of tokens, where each token is designated as being an action data element (i.e., such that in this instance, the training example does not include any observation data elements).

In another example, the training engine 112 can generate an "image captioning" training example that represents: (i) an image, and (ii) an image caption that defines a sequence of text describing the contents of the image. For example, the training engine 112 can generate the training example by concatenating respective sequences of data elements representing the image and the image caption. The sequence of data elements representing the image can be designated as a sequence of observation data elements, and the sequence of data elements representing the image caption can be designated as sequence of action data elements.

In another example, the training engine 112 can generate a "textual question answering" training example that represents: (i) a textual question, and (ii) a textual answer that is responsive to the textual question. For example, the training engine 112 can generate the training example by concatenating respective sequences of data elements representing the textual question and the textual answer. The sequence of data elements representing the textual question can be designated as a sequence of observation data elements, and the sequence of data elements representing the textual answer can be designated as a sequence of action data elements.

In another example, the training engine 112 can generate a "visual question answering" training example that represents: (i) an image and a textual question relevant to the image, and (ii) a textual answer that is responsive to the textual question. For example, the training engine 112 can generate the training example by concatenating respective sequences of data elements representing the image, the textual question, and the textual answer. The sequences of data elements representing the image and the textual question can be designated as sequences of observation data elements, and the sequence of data elements representing the textual answer can be designated as a sequence of action data elements.

In another example, the training engine 112 can generate an "image classification" training example that represents: (i) an image, and (ii) a classification of the image of into a category from a predefined set of categories. For example, each category can represent a respective type of object, an image can be classified as being included in a category if it shows an object of the type represented by the category, and each category can be represented by a respective numerical value. The training engine 112 can generate the training example by concatenating: (i) a sequence of data elements representing the image, and (ii) a numerical value representing the classification of the image. The sequence of data elements representing the image can be designated as a sequence of observation data elements, and the numerical value representing the classification of the image can be designated as an action data element.

The training engine 112 can train the action selection neural network 108 on training examples from a diverse set of multiple different domains. In particular, the training engine 112 can train the action selection neural network on training examples representing interaction of multiple different agents with multiple different environments to perform multiple different tasks. (Examples of possible agents, environments, and tasks are described above). Training the action selection neural network 108 on training examples from multiple domains can encode a flexible and transferable understanding of agent control in the parameters of the action selection neural network that can enable the action selection neural network to generalize rapidly and effectively to new domains. In particular, training the action selection neural network 108 on multiple domains can enable the action selection neural network 108 to achieve an acceptable performance on a task in a new domain after being trained on a small number of training examples from the new domain. In some cases, training on multiple domains can enable the action selection neural network 108 to achieve an acceptable performance on a task in a new domain even if the action selection neural network has not been trained on any training examples from the new domain.

Training the action selection neural network 108 on additional training examples other than those representing agent interaction with environments, e.g., the language modeling, image captioning, textual question answering, visual question answering, and image classification training examples described above, can accelerate the training and improve the performance of the action selection neural network. For example, training the action selection neural network on the language modeling training examples can improve the capability of the action selection neural network to implicitly infer the meaning of natural language prompts provided for control tasks.

Figure 2:
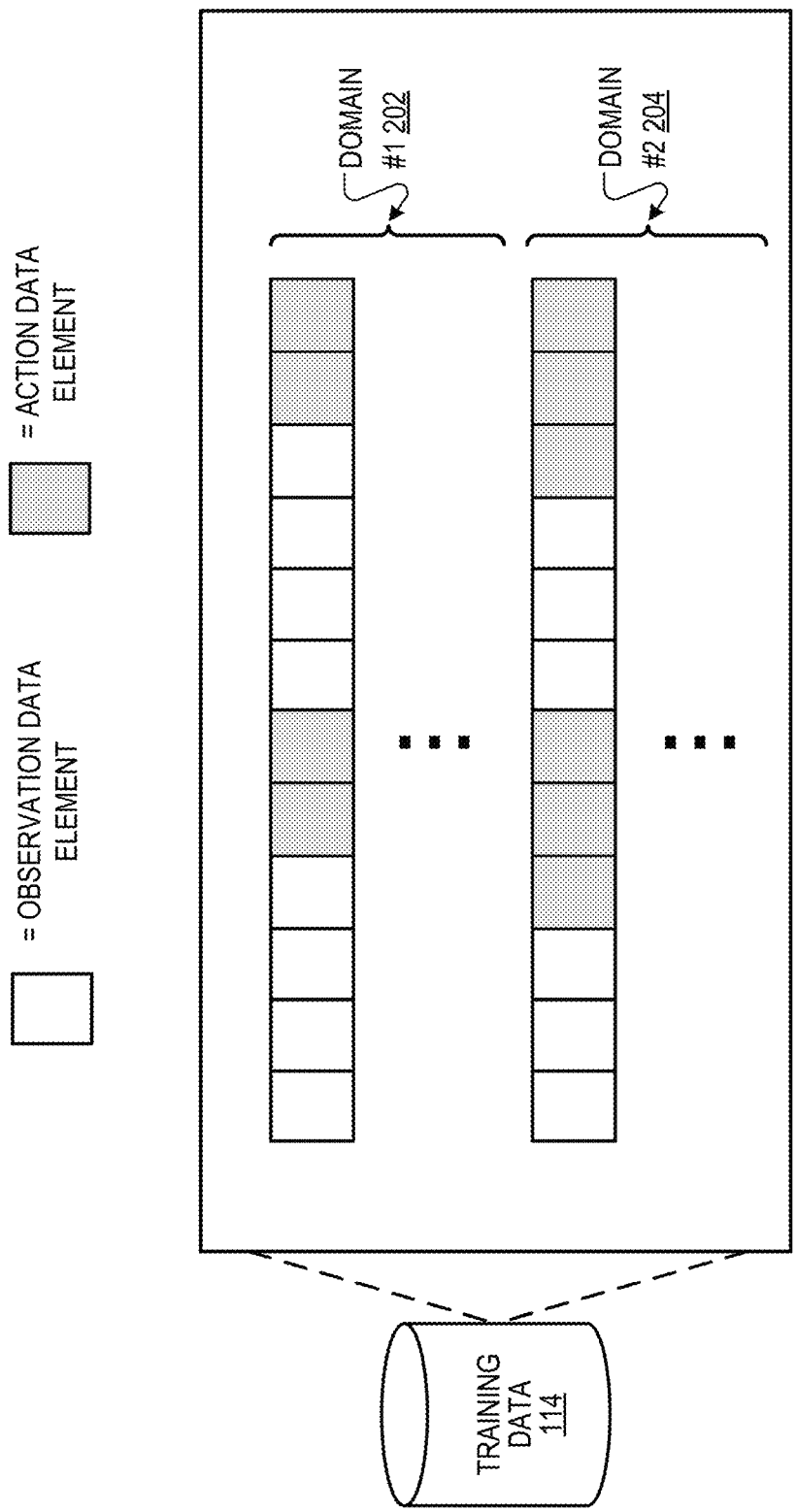
FIG. 2 illustrates training examples from different domains.

Generally, training examples from different domains can represent actions and observations using sequences of data elements of different lengths. For example, as illustrated in FIG. 2, training examples from "domain #1" 202 represent observations using a sequence of four data elements and actions using a sequence of two data elements, and training examples from "domain #2" 204 represent observations using a sequence of three data elements and actions using a sequence of three data elements. This can present an issue for conventional action selection neural networks, e.g., that have neural network architectures configured to process fixed-size observations to generate fixed-size actions. In contrast, the operations of the action selection neural network 108 can flexibly adapt to process training examples from any domain, irrespective of domain-specific dimensionalities of observations and actions. For example, to generate an action having the dimensionality appropriate for a particular domain, the action selection neural network 108 can continue autoregressively sampling action data elements until the generated action has the appropriate dimensionality.

Figure 3A:
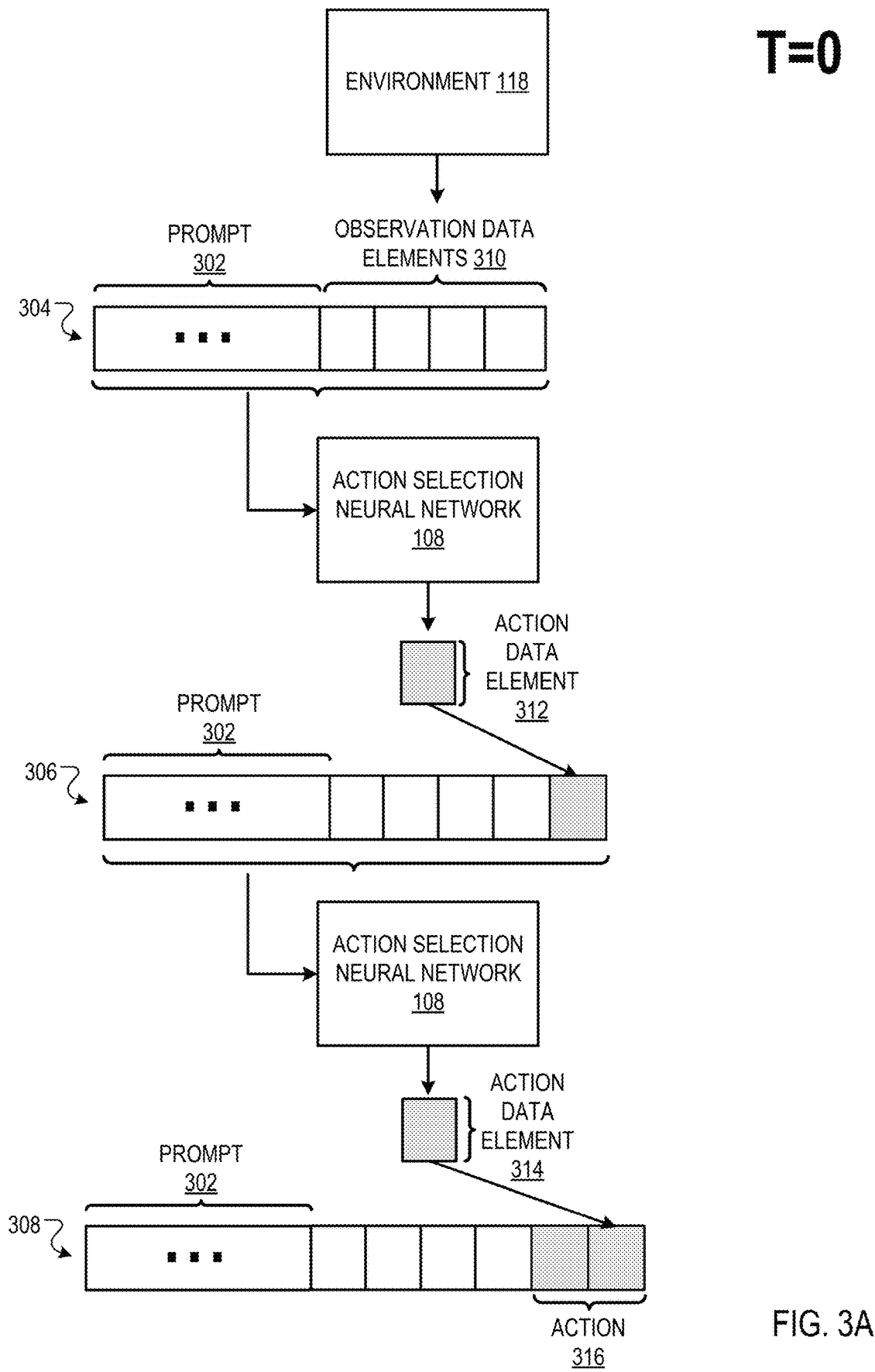
FIG. 3A and FIG. 3B illustrate operations performed by an action selection system to select actions to be performed by agent interacting with an environment to accomplish a task.
Figure 3B:
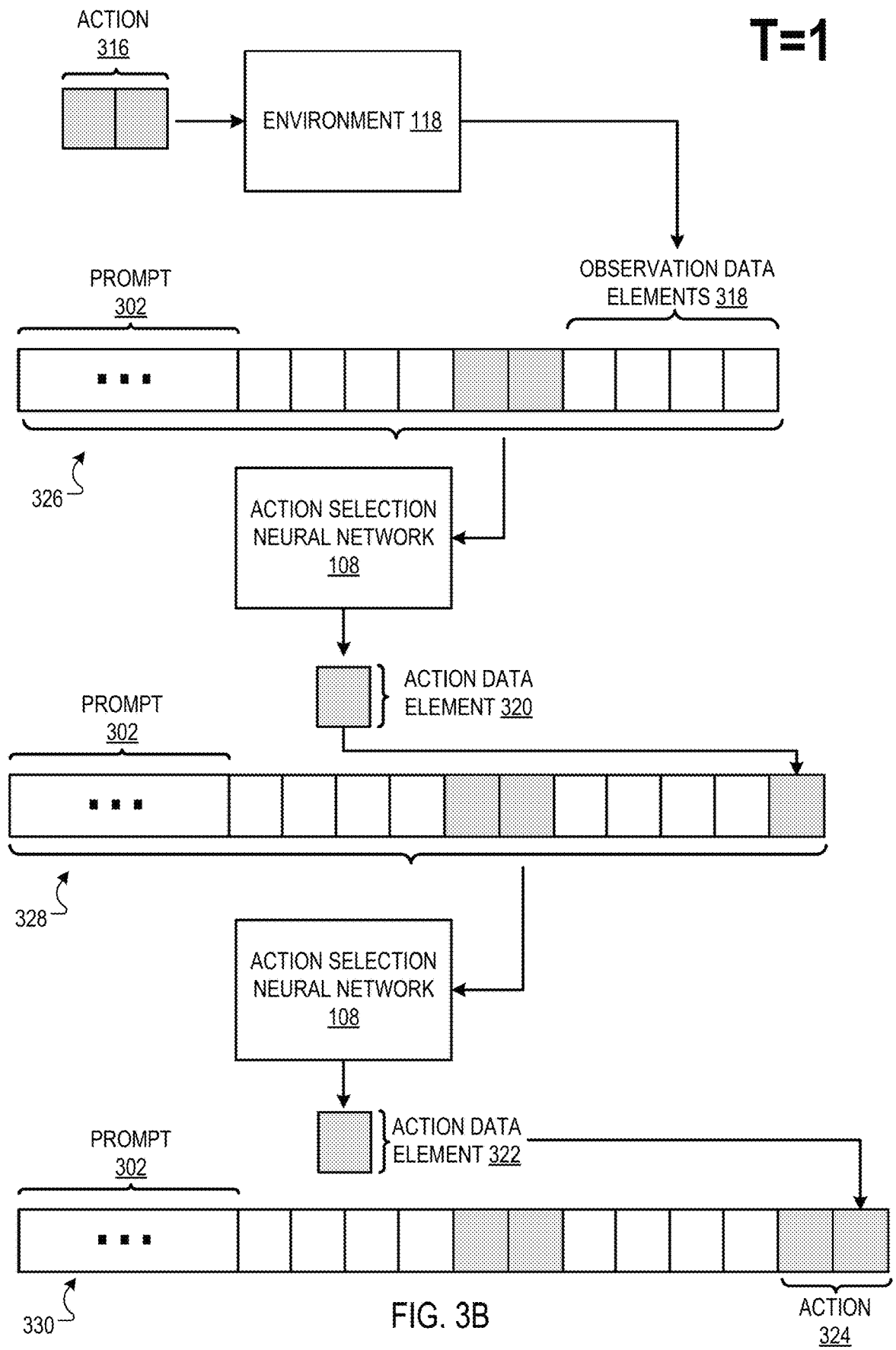

FIG. 3A and FIG. 3B illustrate operations performed by the action selection system 100 to select actions to be performed by agent interacting with an environment to accomplish a task.

FIG. 3A illustrates the operations performed to autoregressively generate a sequence of action data elements representing the action to be performed by the agent at the first time step, i.e., T=0. The system initializes the current task state 304 using a prompt 302. The prompt 302, which is represented as a sequence of data elements, can include any appropriate data relevant to the task to be performed by the agent, e.g., a demonstration of the task, or natural language instructions relevant to the task.

The system 100 receives an observation from the environment that represents the current state of the environment, e.g., in the form of an image of the environment. The system represents the observation as a sequence of observation data elements 310, e.g., by concatenating the numerical values in a collection of numerical values representing the observation into a sequence in an arbitrary but fixed order.

The system 100 then concatenates the observation data elements to the current task state 304.

The system 100 processes the current task state 304 using the action selection neural network 108 to generate a probability distribution over a set of possible action data elements, and then selects an action data element 312 in accordance with the probability distribution over the set of possible action data elements.

The system 100 concatenates the action data element 312 to the current task state 306, and processes the updated task state 306 using the action selection neural network 108 to generate another action data element 314. More specifically, the system processes the updated task state 306 to generate a probability distribution over the set of possible action data elements, and then selects the action data element 314 in accordance with the probability distribution over the set of possible action data elements.

The generated sequence of action data elements (i.e., including the action data elements 312 and 314) define the action 316 to be performed by the agent at the first time step.

FIG. 3B illustrates operations performed to autoregressively generate a sequence of action data elements representing the action to be performed at the second time step, i.e., T=1.

The agent performs the action 316 selected at the first time step (T=0), and the environment transitions into a new state as a result of the action performed by the agent. The system receives an observation characterizing the new state of the environment at the second time step, represents the observation as a sequence of observation data elements 318, and concatenates the observation data elements to the current task state 326. Thus the current task state 326 includes the prompt 302, the sequence of observation data elements representing the observation at the first time step, the sequence of action data elements representing the action performed by the agent at the first time step, and the sequence of observation data elements 318 representing the observation at the second time step.

The system 100 processes the current task state 326 using the action selection neural network to generate a score distribution over the set of possible action data elements, and selects an action data element 320 in accordance with the score distribution over the set of possible action data elements.

The system then concatenates the action data element 320 to the current task state 328.

The system processes the updated task state 328 using the action selection neural network 108 to generate another score distribution over the set of possible action data elements, and selects an action data element 322 in accordance with the score distribution over the set of possible action data elements. The system concatenates the action data element 322 to the current task state 330, and provides the current task state 330 for use in selecting the action to be performed by the agent at the next time step.

The generated sequence of action data elements 320 and 322 define an action 324 to be performed by the agent at the second time step.

Figure 4:
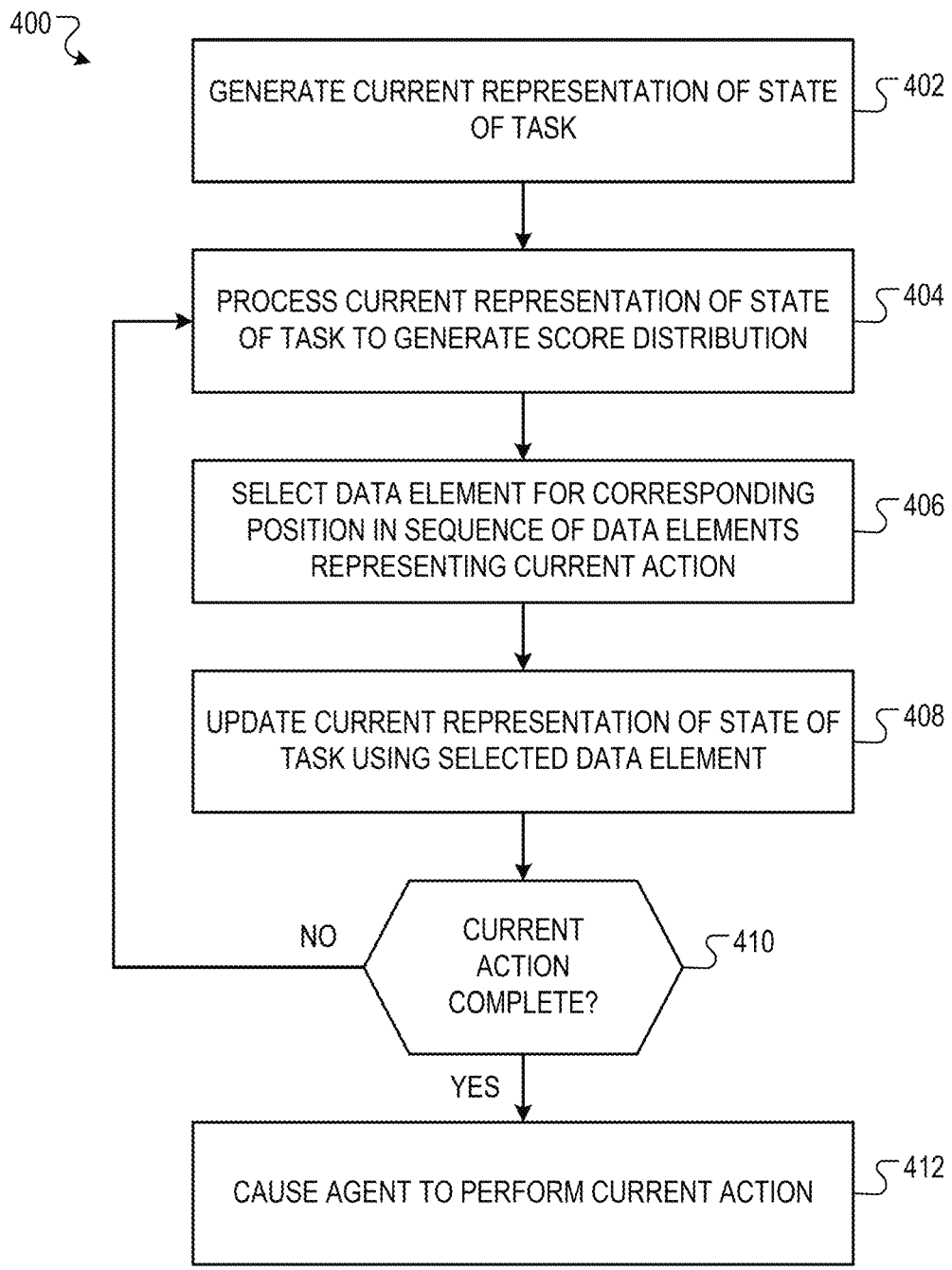
FIG. 4 is a flow diagram of an example process for selecting an action to be performed by an agent to interact with an environment at a current time step.

FIG. 4 is a flow diagram of an example process 400 for selecting an action to be performed by an agent to interact with an environment at a current time step. For convenience, the process 400 will be described as being performed by a system of one or more computers located in one or more locations. For example, an action selection system, e.g., the action selection system 100 of FIG. 1, appropriately programmed in accordance with this specification, can perform the process 400.

The system generates a current representation of a state of a task being performed by the agent in the environment as of the current time step as a sequence of data elements (402). The sequence of data elements can be, e.g., a sequence of numerical values, a sequence of embeddings, or a sequence that includes numerical values at some positions and embeddings at other positions.

The system autoregressively generates a sequence of data elements representing a current action to be performed by the agent at the current time step. In particular, the system performs steps 404-410 for each position starting from the first position in the sequence of data elements representing the current action. For convenience, steps 404-410 will be described as being performed for a current position in the sequence of data elements representing the current action.

The system processes the current representation of the state of the task using the action selection neural network to generate a score distribution over a set of possible data elements (404).

The system selects a data element for the current position in the sequence of data elements representing the current action in accordance with the score distribution (406).

The system updates the current representation of the state of the task by concatenating the selected data element for the position to the current representation of the state of the task (408).

The system determines if the current action is complete (410). If the current position is the final position in the sequence of data elements representing the current action, then the system determines the current action is complete and proceeds to step 412. Otherwise, the system determines the current action is not complete and loops back to step 404.

After autoregressively generating the sequence of data elements representing the current action, the system causes the agent to perform the current action at the current time step (412).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for selecting actions to be performed by an agent to interact with an environment using an action selection neural network, the method comprising, at each time step in a sequence of time steps:
   generating a current representation of a state of a task being performed by the agent in the environment as of the current time step as a sequence of data elements;
   autoregressively generating a sequence of data elements representing a current action to be performed by the agent at the current time step, comprising, for each position starting from a first position in the sequence of data elements representing the current action:
      processing the current representation of the state of the task using the action selection neural network to generate a score distribution over a set of possible data elements;
      selecting a data element for the position in the sequence of data elements representing the current action in accordance with the score distribution; and
      updating the current representation of the state of the task by concatenating the selected data element for the position to the current representation of the state of the task; and
   after autoregressively generating the sequence of data elements representing the current action, causing the agent to perform the current action at the current time step;
   wherein the action selection neural network has been trained on a set of training examples that includes respective training examples from multiple different control domains;
   wherein each training example from each control domain is defined by a training sequence of data elements and includes an interleaved sequence of: (i) observations of a corresponding environment, each observation including a respective sequence of observation data elements, and (ii) actions performed by the agent to interact with the corresponding environment, each action including a respective sequence of action data elements; and
   wherein the multiple different control domains include a first control domain where observations of the corresponding environment include sequences of observation data elements that each have a first sequence length and represent observations with a first dimensionality, and a second control domain where observations of the corresponding environment include sequences of observation data elements that each have a second, different sequence length and represent observations with a second, different dimensionality.

2. The method of claim 1, wherein for each time step in the sequence of time steps, generating the current representation of the state of the task as of the current time step comprises:
   receiving a current observation characterizing a state of the environment at the current time step;
   generating a representation of the current observation as a sequence of data elements; and
   including the representation of the current observation as a sequence of data elements in the current representation of the state of the task as of the current time step.

3. The method of claim 2, wherein the current observation is defined by a collection of numerical values, and generating the representation of the current observation as a sequence of data elements comprises:
   concatenating each numerical value in the collection of numerical values defining the current observation into a sequence of numerical values in a predefined order.

4. The method of claim 3, wherein generating the representation of the current observation as a sequence of data elements further comprises:
   discretizing each numerical value in the collection of numerical values defining the current observation.

5. The method of claim 2, wherein the current observation characterizing the current state of the environment at the current time step comprises an image defined by an array of pixels.

6. The method of claim 2, wherein generating the representation of the current observation as a sequence of data elements comprises:
   combining a target return to be achieved by interaction of the agent with the environment with the representation of the current observation as a sequence of data elements, wherein the target return defines a cumulative measure of rewards to be achieved as a result of the interaction of the agent with the environment.

7. The method of claim 2, wherein for each time step after a first time step in the sequence of time steps, including the representation of the current observation as a sequence of data elements in the current representation of the state of the task as of the current time step comprises:
receiving a representation of the state of the task as of a previous time step as a sequence of date elements; and
concatenating the representation of the current observation as a sequence of data elements to the representation of the state of the task as of the previous time step as a sequence of data elements to generate the current representation of the state of the task as of the current time step.

8. The method of claim 7, wherein the representation of the state of the task as of the previous time step represents, for each time step preceding the current time step: (i) a respective observation characterizing a state of the environment at the time step, and (ii) a respective action performed by the agent at the time step.

9. The method of claim 2, wherein at a first time step in the sequence of time steps, including the representation of the current observation as a sequence of data elements in the current representation of the state of the task as of the current time step comprises:
receiving a prompt that comprises data characterizing the task to be performed by the agent in the environment;
generating a representation of the prompt as a sequence of data elements; and
concatenating the representation of the current observation as a sequence of data elements to the representation of the prompt as a sequence of data elements to generate the current representation of the state of the task as of the current time step.

10. The method of claim 9, wherein prompt comprises one or more of: a demonstration of the task, a goal observation characterizing a goal state of the environment, or a sequence of text in a natural language that provides instructions related to the task.

11. The method of claim 1, wherein, for each training example in the set of training examples:
at least one of the data elements in the training sequence of data elements defining the training example is designated as an action data element; and
training the action selection neural network on the training example comprises training the action selection neural network to generate the action data elements included in the training example.

12. The method of claim 1, wherein the multiple different control domains include a first control domain where actions performed by the corresponding agent have a first dimensionality, and a second control domain where actions performed by the corresponding agent have a second, different dimensionality.

13. The method of claim 1, wherein the set of training examples includes a plurality of language modeling training examples, wherein each language modeling training example represents a sequence of text in a natural language.

14. The method of claim 1, wherein the action selection neural network comprises a plurality of self-attention neural network layers.

15. The method of claim 1, wherein for each position starting from the first position in the sequences of data elements representing the current action, selecting the data element for the position comprises:
selecting a data element having a highest score under the score distribution.

16. The method of claim 1, wherein for each time step in the sequence of time steps, the sequence of data elements representing the state of the task as of the current time step comprises: a sequence of numerical values; a sequence of embeddings; or a sequence that includes numerical values at some positions and embeddings at other positions.

17. A system comprising:
one or more computers; and
one or more storage devices communicatively coupled to the one or more computers,
wherein the one or more storage devices store instructions that, when executed by the one or more computers, cause the one or more computers to perform operations for selecting actions to be performed by an agent to interact with an environment using an action selection neural network, the operations comprising, at each time step in a sequence of time steps:
generating a current representation of a state of a task being performed by the agent in the environment as of the current time step as a sequence of data elements;
autoregressively generating a sequence of data elements representing a current action to be performed by the agent at the current time step, comprising, for each position starting from a first position in the sequence of data elements representing the current action:
processing the current representation of the state of the task using the action selection neural network to generate a score distribution over a set of possible data elements;
selecting a data element for the position in the sequence of data elements representing the current action in accordance with the score distribution; and
updating the current representation of the state of the task by concatenating the selected data element for the position to the current representation of the state of the task; and
after autoregressively generating the sequence of data elements representing the current action, causing the agent to perform the current action at the current time step;
wherein the action selection neural network has been trained on a set of training examples that includes respective training examples from multiple different control domains;
wherein each training example from each control domain is defined by a training sequence of data elements and includes an interleaved sequence of: (i) observations of a corresponding environment, each observation including a respective sequence of observation data elements, and (ii) actions performed by the agent to interact with the corresponding environment, each action including a respective sequence of action data elements; and
wherein the multiple different control domains include a first control domain where observations of the corresponding environment include sequences of observation data elements that each have a first sequence length and represent observations with a first dimensionality, and a second control domain where observations of the corresponding environment include sequences of observation data elements that each have a second, different sequence length and represent observations with a second, different dimensionality.

18. One or more non-transitory computer storage media storing instructions that when executed by one or more computers cause the one or more computers to perform operations for selecting actions to be performed by an agent to interact with an environment using an action selection neural network, the operations comprising, at each time step in a sequence of time steps:
- generating a current representation of a state of a task being performed by the agent in the environment as of the current time step as a sequence of data elements;
- autoregressively generating a sequence of data elements representing a current action to be performed by the agent at the current time step, comprising, for each position starting from a first position in the sequence of data elements representing the current action:
  - processing the current representation of the state of the task using the action selection neural network to generate a score distribution over a set of possible data elements;
  - selecting a data element for the position in the sequence of data elements representing the current action in accordance with the score distribution; and
  - updating the current representation of the state of the task by concatenating the selected data element for the position to the current representation of the state of the task; and
- after autoregressively generating the sequence of data elements representing the current action, causing the agent to perform the current action at the current time step;

wherein the action selection neural network has been trained on a set of training examples that includes respective training examples from multiple different control domains;

wherein each training example from each control domain is defined by a training sequence of data elements and includes an interleaved sequence of: (i) observations of a corresponding environment, each observation including a respective sequence of observation data elements, and (ii) actions performed by the agent to interact with the corresponding environment, each action including a respective sequence of action data elements; and wherein the multiple different control domains include a first control domain where observations of the corresponding environment include sequences of observation data elements that each have a first sequence length and represent observations with a first dimensionality, and a second control domain where observations of the corresponding environment include sequences of observation data elements that each have a second, different sequence length and represent observations with a second, different dimensionality.

* * * * *